(Model.)
M. McGARY.
MOLE TRAP.
No. 463,736. Patented Nov. 24, 1891.
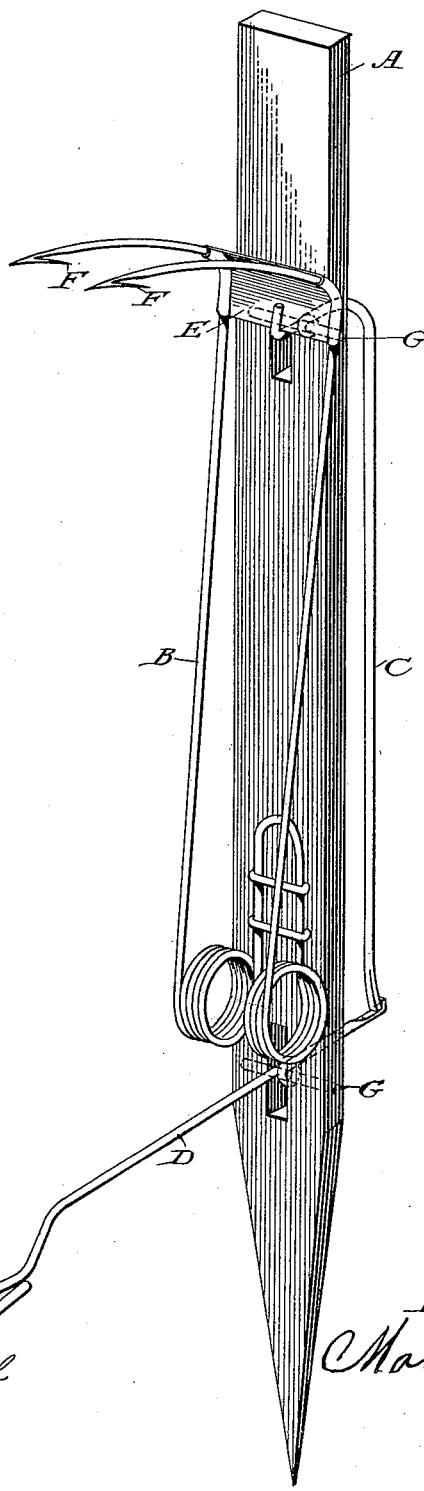
Witnesses.
William T. Reddish
James P. Nesbit
Inventor.
Marcellus McGary

UNITED STATES PATENT OFFICE.

MARCELLUS McGARY, OF CRAWFORD STATION, MISSOURI.

MOLE-TRAP.

SPECIFICATION forming part of Letters Patent No. 463,736, dated November 24, 1891.

Application filed May 22, 1891. Serial No. 393,684. (Model.)

*To all whom it may concern:*

Be it known that I, MARCELLUS MCGARY, a citizen of the United States, residing at Crawford Station, in the county of Scotland, in the State of Missouri, have invented a new and useful Mole-Trap, (not patented in any country,) of which the following is a specification.

My invention relates to improvements in mole-traps in which a strong double helix spring curved outwardly at the free extremity into impaling-points, with or without barbs, and connected together at the point of curvature by a metal brace or support, and which serves to hold said points in position when the trap is set, and which operates in conjunction with triggers to spring the trap and to throw the points forward and downward into the ground, thus impaling the mole in its trail; and the object of my invention is to provide an impaling mole-trap which will impale and destroy a mole in its trail. I attain this object by the mechanism illustrated in the accompanying drawing, in which the figure is a view of the entire trap as it appears when set.

The stake A, of metal or wood, pointed below for the purpose of being driven vertically into the ground, constitutes the entire support for the trap, and is the frame-work to which all the parts are attached. The spring B is made of one strong piece of spring metal bent at its center into a double helix spring and fastened securely to stake A near sharpened end, the two free ends running parallel to the point of curvature at the slot in stake A, where trigger C is used to set the trap, and connected together with the metal brace and there curved outwardly, as shown in diagram. At the point where the free extremity of the spring B comes in contact with the stake A when the trap is set the trigger C projects through stake A, and working freely in a slot, and is attached to stake A by a complete turn in the wire, through which a rivet G is inserted, and extends down said stake A to a slot in which trigger D works in same manner as trigger C and connects with said trigger D, the lower end of trigger C being flattened to engage the notched end of trigger D. Trigger D is a strong piece of wire projecting through stake A and working in a slot in stake A immediately above the sharpened end of said stake A, and connected with trigger C when trap is set, the long end projecting out from stake A and having the end turned or bent into a ring shape, so as to give more resistance when the ground is forced up by the mole, and having a downward turn in the wire just back of the ring, so as to place the ring on the ground sufficiently low as not to interfere with the free workings of the triggers C and D, as shown in accompanying drawing.

In utilizing the trap for catching and destroying moles, press the dirt down across the trail with the foot, push the stake A down to one side of the trail, just allowing the broad end of trigger D to rest flat on the spot pressed down in the trail, force the free end of spring B back against stake A to the point where trigger C connects with the metal cross-piece in said spring B, bring the long end of trigger C down and connect with notched end of trigger D. The mole coming from either direction of the trail finds the obstruction in his path, and in-rooting up the dirt against where broad end of trigger D is resting will thereby release said trigger D from trigger C, which connects with and holds free end of spring B, and releases said spring B, causing it to fly forward and downward with great force, the sharpened points plunging into the trail and through the back of the mole.

I am aware that prior to my invention mole-traps have been invented; but I am not aware that any such mole-trap as I have herein described has ever been invented.

What I claim as my invention, and desire to secure by Letters Patent, is—

In a mole-trap, the combination of the spring B, with its sharpened points secured to the stake A near the lower end thereof, the trigger C, attached to stake A in a slot at its upper end and adapted to connect with and hold spring B firmly in position when set, in conjunction with trigger D, working in a slot in lower end of stake A, whereby when trigger D is disturbed it releases trigger C, which in turn releases spring B, substantially as set forth.

MARCELLUS McGARY.

Witnesses:
 WILLIAM T. REDDISH,
 JAMES P. NESBIT.